INVENTOR
REGINALD JOHN DIXON
BY Haseltine, Lake & Co.
ATTORNEYS

July 9, 1935. R. J. DIXON 2,007,564
LATHE AND LIKE MACHINE TOOL
Filed Dec. 13, 1934 7 Sheets-Sheet 2

INVENTOR
REGINALD JOHN DIXON
BY Haseltine, Lake & Co.
ATTORNEYS

July 9, 1935.  R. J. DIXON  2,007,564
LATHE AND LIKE MACHINE TOOL
Filed Dec. 13, 1934   7 Sheets-Sheet 5

INVENTOR
REGINALD JOHN DIXON
BY Haseltine, Lake & Co.
ATTORNEYS

July 9, 1935.  R. J. DIXON  2,007,564
LATHE AND LIKE MACHINE TOOL
Filed Dec. 13, 1934  7 Sheets-Sheet 7

INVENTOR
REGINALD JOHN DIXON
BY Haseltine, Lake & Co.
ATTORNEYS

Patented July 9, 1935

2,007,564

UNITED STATES PATENT OFFICE 2,007,564

LATHE AND LIKE MACHINE TOOL

Reginald John Dixon, Coventry, England, assignor to A. C. Wickman Limited, Coventry, England, a British company Application December 13, 1934, Serial No. 757,279
In Great Britain November 15, 1933

13 Claims. (Cl. 29—41)

This invention relates to lathes and like machine tools.

According to the invention mechanism for actuating one or more tool slides or work holders comprises in combination a cam providing rectilinear feed motion transmitted to one element of a differential gear, a separate cam providing rapid rectilinear motion in both forward and reverse directions transmitted to the second element of the differential gear, the resultant motion of the third element in the said differential gear being transmitted to the tool slide or slides or work holder or holders. The respective motions derived from the two cams may be resolved by the motions of a lever or levers, the fulcrum or fulcrums of which is or are moved by the motion derived from one of the cams, so that the lever has a variable stroke. Instead of a lever of variable stroke, however, it would be possible to use a number of levers, each having a different stroke, while still obtaining the advantages of the cam arrangement and the differential means, although the use of interchangeable levers would be less convenient, and would not give the infinite possibilities of adjustment obtained by the use of a variable stroke lever. The means whereby resolution of the motions derived from the two cams is effected may be varied in several ways, but the accompanying drawings and diagrams illustrate examples of mechanism for giving practical effect to the invention.

In the drawings, Figures 1 to 4, the reference numeral 20 indicates the base of the mechanism, 21 a shaft on which is a chain sprocket 22, receiving a drive from any convenient source, which drive is transmitted from the shaft 21 through gears 23 and 24 to a worm shaft 25, from which a worm 26 transmits rotation to a cam shaft 28, on which are mounted cams 30, 31. The cam 30 provides the cutting feed and return motion for the tool. The cam 31 provides the rapid idle movement of the tool, forward and reverse. Each of these cams 30 and 31 is in two parts, the outer members being indicated at 30a and 31a, respectively. The motion derived from the cam 30 is transmitted by a lever 32 and link 33 to a rack 34. The pivot by which the link 33 is connected to lever 32 may be clamped at any position along the curved T slot formed on said lever 32, the motion transmitted to the rack 34 varying between zero and a maximum according as the pivot and the fulcrum of lever 32 are closer together or further apart, the motion being zero when the pivot and fulcrum are coincident.

During that part of the cycle of the cam 30 when no motion is transmitted to the rack 34, motion is being transmitted by cam 31 to a rolling pinion 36 on a slidable member 35, the pinion 36 meshing with both the stationary rack 34 and a slidable rack 37. The resultant motion of rack 37 is therefore twice that of the pinion 36, and provides the rapid forward movement to the tool slide.

During that part of the cycle in which the slidable member 35 and its associated pinion 36 derive no motion from the cam 31, the rack 34 is caused to slide by the movement of lever 32 transmitted through link 33 actuated by cam 30, the motion of rack 34 being transmitted through pinion 36 to rack 37 connected to the tool slide, to which is imparted the cutting stroke at the desired rate.

During the cutting stroke, it is preferable that the slidable member 35 should be held by the cam against an abutment.

Upon completion of the working stroke, the rack 37 is rapidly returned to its initial position by simultaneous movement of rack 34 and pinion 36. A friction clutch 40 is actuated through a lever 41, a slidable member 42 which carries a block 48 having a pin 49 engaging a slot in the upper end of the said lever 41, and dogs 43, 44 mounted on the worm wheel carried on the cam shaft 28, these dogs having inclined faces which at the completion of the cutting stroke engage the slidable member 42 to rock the lever 41 and thus to engage the friction clutch 40, causing the worm shaft 25 to rotate at a higher speed, over-running the drive received from the chain pulley 22, this being permitted by reason of the presence of a free wheel 45 on the shaft 25. The higher speed is derived from a chain sprocket 46 which is separately driven from any convenient source.

By this mechanism any working stroke of the tool slide from zero to the maximum is obtainable, as determined by the dimensions of the cam 30 and lever 32, together with an idle rapid stroke which is substantially constant irrespective of adjustments of the working stroke.

Figure 1:
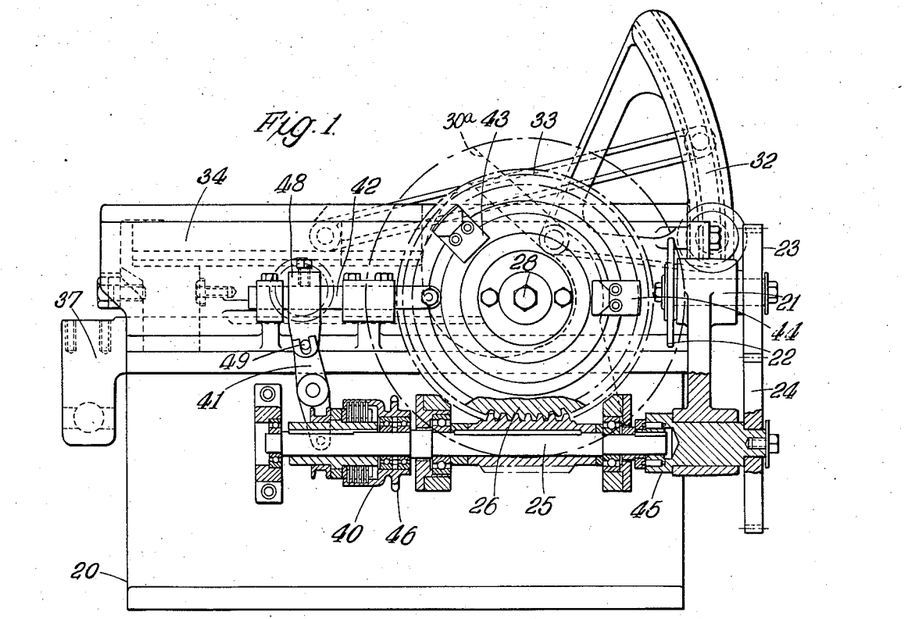
Figure 1 represents in elevation partly in section, one arrangement of such a mechanism.
Figure 2:
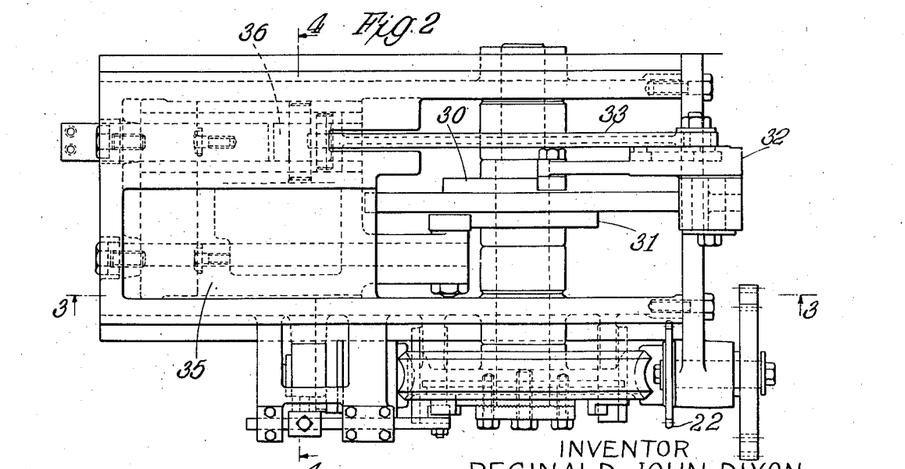
Figure 2 is a plan of the mechanism shown in Figure 1.
Figure 3:
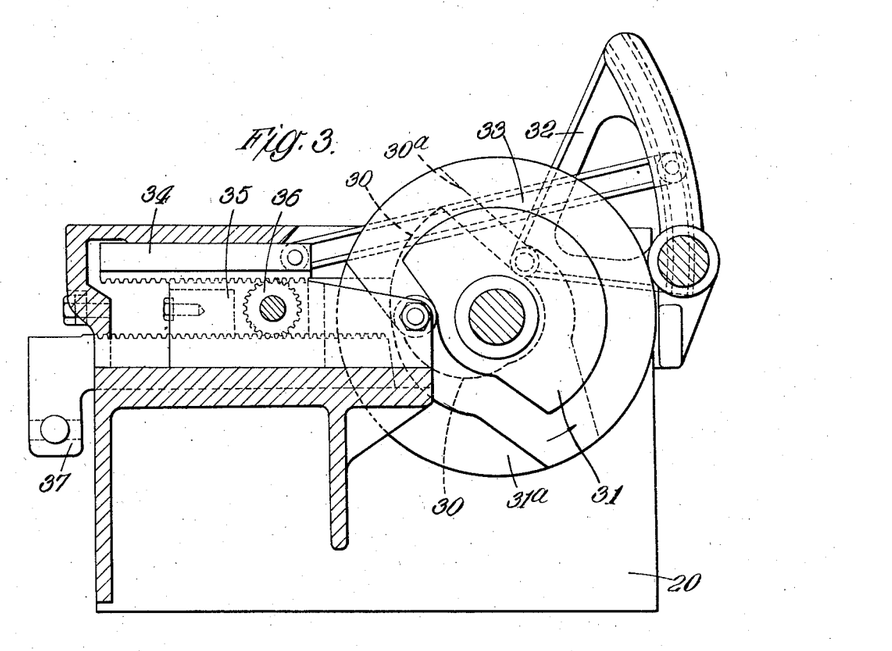
Figure 3 is a sectional elevation taken on the line 3—3 in Figure 2.
Figure 4:
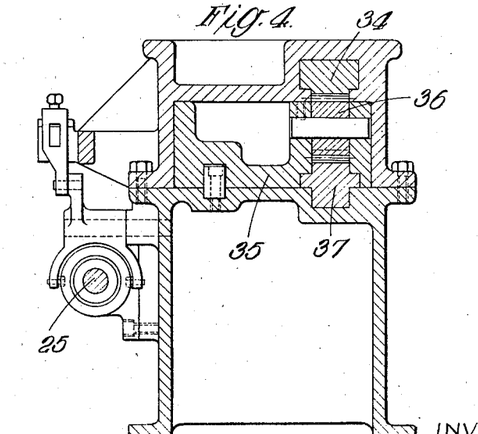
Figure 4 represents the same mechanism in section on the line 4—4 in Figure 2.
Figure 5:
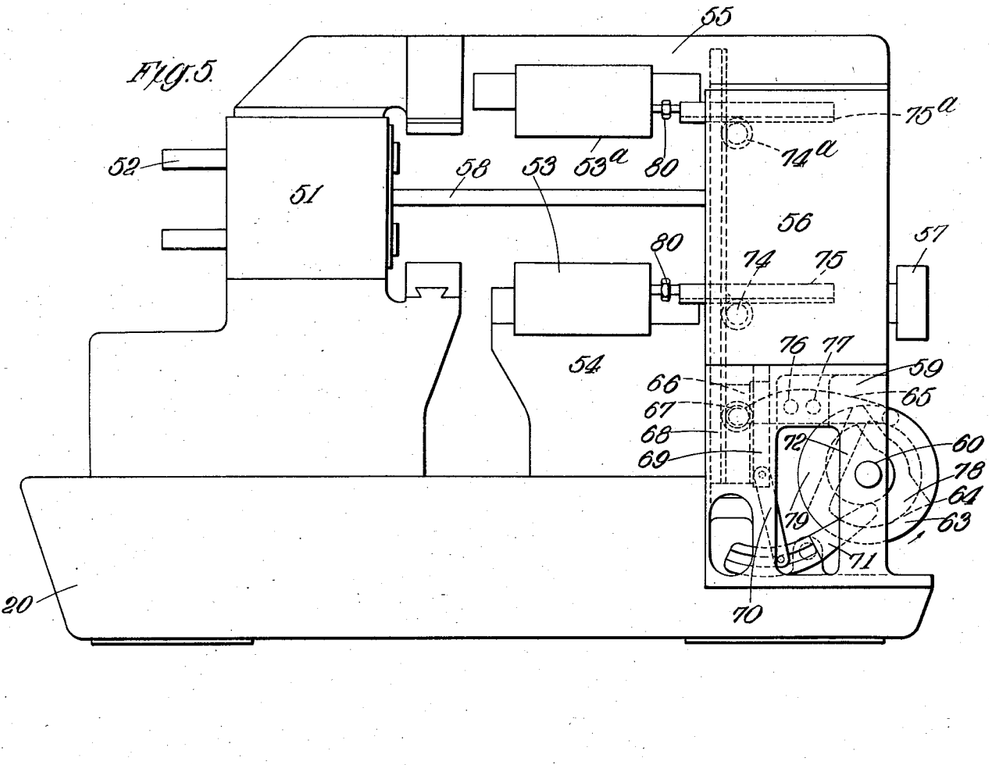
Figure 5 represents in side elevation a form of lathe embodying the invention.
Figure 6:
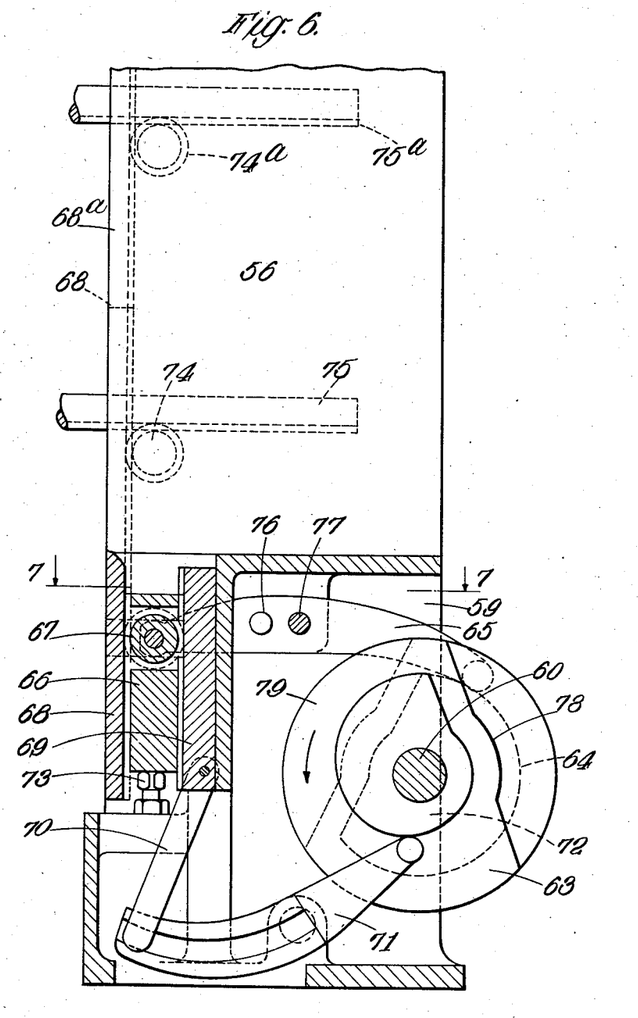
Figure 6 is a sectional view on a larger scale of a portion of the machine shown in Figure 5, taken on the line 6—6 in Figure 7.
Figure 7:
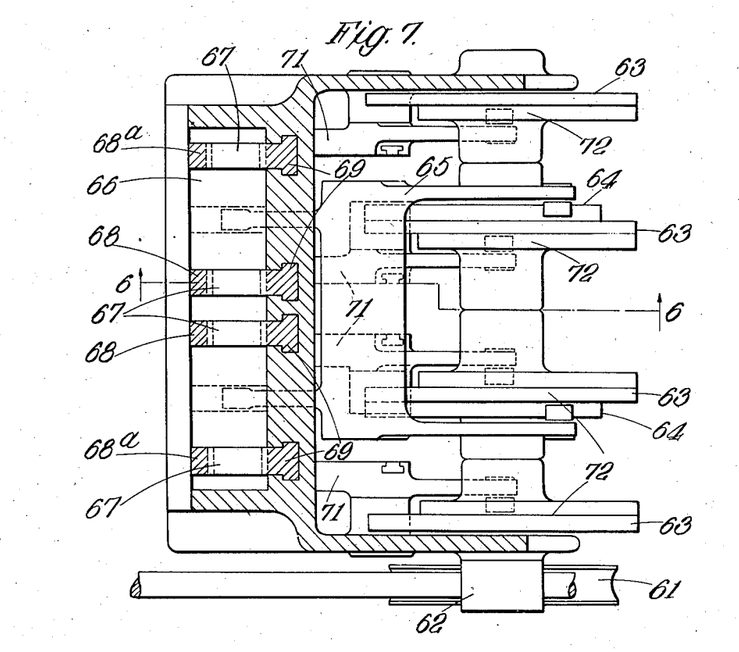
Figure 7 is a horizontal section taken on the line 7—7 in Figure 6.

Referring now to Figures 5, 6 and 7, which show a modified mechanism embodied in a turret lathe, upon the base or swarf tray 20 is mounted a spindle drum housing 51, with indexible spindle drum and work spindles 52. This spindle drum is indexed and fixed in such a manner that the spindles in succession are always in axial alignment with the four longitudinal tool slides 53 and 53A, which are supported by the bed 54 and overhead beam 55 respectively. The column 56 contains the gear drive for the spindles and feed mechanism. A pulley 57 drives the work spindles 52 through suitable gearing and a transmission shaft 58. In the housing 59 is the mechanism for operating the longitudinal tool slides 53 and 53A. A shaft 60, driven by worm 62 and wheel 61 (Figure 7) carries cam discs 63. Two of these discs are equipped with cams 64, which operate a fork lever 65 having two alternative pivot positions 76 and 77. A pinion slide 66 carries four pinions 67, with which racks 68, 68A and 69 are constantly in mesh. The racks 69 are connected by rods 70 to swivel levers 71 operated by lead cams 72. The two end working slides 53 are each operated from a rack 68 through the medium of pinions 74 and racks 75, endwise positioning being provided by right and left hand adjusting screws 80. Similarly the two end working slides 53A are operated from racks 68A through pinions 74A and racks 75A.

When the lever 65 has been operated by the cam 64, bringing the pinion slide 66 from its upper position, against stops 73, the pinion slide 66 is locked whilst the rollers on the lever 65 are in contact with the periphery of the concentric cams 64. The downward movement of the pinion slide 66 provides the rapid forward travel of the tools slides 53 and 53A, this travel being equal to twice the length of the stroke of the pinion slide 66, as the pinions 67 have rolled along the stationary rack 69, which has been held in position between cam sections 72 and 78. The variable stroke levers 71 are now operated by the lead cams 72; the racks 69 are thus pushed upwards by means of the rods 70. The pinions 67 are rotated and transmit motion to the racks 68 and 68A, which are moved downwards. This provides the working or cutting strokes, the lengths of which are adjustable by locking the rods 70 in the desired position in T or dovetail slots in the variable stroke levers 71. The lower ends of these rods 70 can be clamped concentrically with the fulcrum points of the levers 71 so that the working travel can be zero, if a corresponding slide is used for recessing or a similar operation. The return strokes are now effected by return cams 78 and 79, simultaneously bringing the levers 65 and 71 into their original positions, that is, the rack 69 is drawn downwards and the pinion slide 66 is moved upwards, these combined movements being transmitted by pinions 67, racks 68 and 68A and pinions 74 and 74A to the tool slides. By utilizing the alternative pivot positions 76 or 77, the stroke of the pinion slide 66 may be varied, with consequent alteration in the length of rapid travel of the tool slides.

Figure 8:
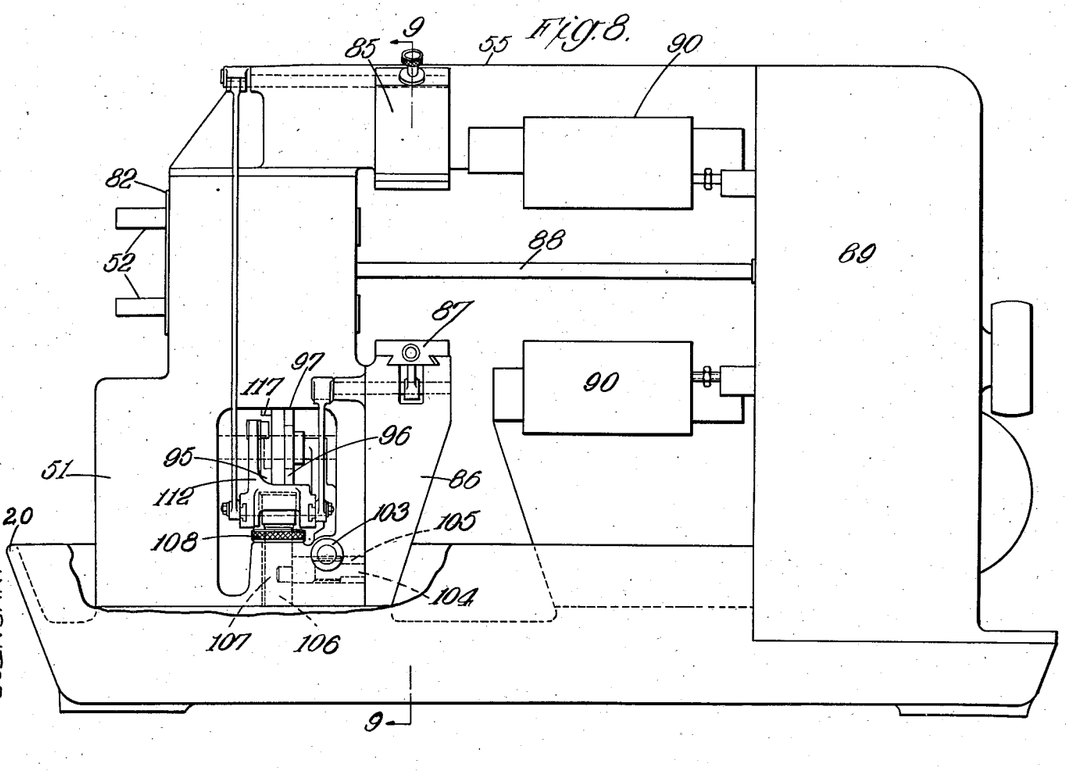
Figure 8 represents in side elevation another lathe.
Figure 9:
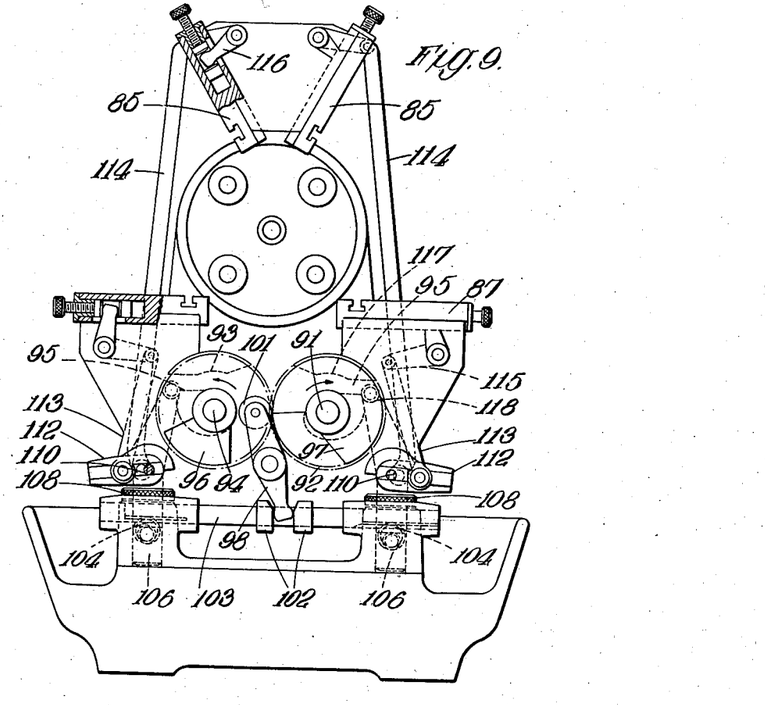
Figure 9 is a cross section of the lathe shown in Figure 8, taken on the line 9—9 in Figure 8.

Referring now to Figures 8 and 9 on the base or swarf tray 20 is a housing 51 carrying the drum 82, spindles 52 and overhead beam 55, which supports the two overhead cross slides 85. An extension 86 of the housing carries lower cross slides 87. The work spindles 52 are driven from gearing in the column 89 through the centre drive shaft 88. The longitudinal slides 90 are operated by a cam shaft (not shown) in the column 89. A cam shaft 91 driven by worm and wheel carries the cams for indexing, bar feed, etc., and also the cam disc 92, which is toothed on its periphery, and thus drives a cam disc 93 on a shaft 94. These discs 92 and 93 carry on one side cams 95 which operate the slow or working travel, and on the other side cams 96 and 97, which effect the fast idle movement of the slides 85 and 87. The rapid return travel is obtained when the cam section 96 moves a lever 98 through the medium of a roller 101 over towards the cam shaft 91. The lower end of the lever 98 pushes against collars 102 and thus moves a rod 103. Rack teeth on the ends of the rod 103 engage with teeth cut in shafts 104 which bear at one side in the main housing 51 and on the other in bushes 105. Each shaft 104 has an eccentric extension which fits into a slot in a pillar 106, the latter being held against rotary movement by a key 107, and locked in the lower or working position against the pillar housing by a stop collar 108. The pillar 106 provides a bearing for a fulcrum pin 110, which carries operating levers 112. T slots are milled in the levers 112 and cary rods 113 and 114, which connect with the cross slide operating levers 115 and 116. The eccentric on the shaft 104 is rotated through 180 degrees by the rod 103 operated by the cams 96 and 97 and the lever 98, thus raising the pillar 106 together with the lever 112. As the roller 118, on the operating arm of the lever 112, is guided between the cam 117 and the hub of the cam disc 92, the rod 113 is carried upwards, thus transmitting motion to the cross slides through the levers 115 and 116. The rapid forward movement of the slides is obtained when the lever 98 is moved in the opposite direction, by the cam 97 on the cam disc 92, thus reversing the eccentric movement, and locking the pillar 106 against the housing by the locking ring 108. The slow or cutting movement is now effected by the swivel lever 112 being moved by the lobe of the form cam 95. The connecting rods 113 and 114 with the levers 115 and 116 again transfer the movement to the lower and upper cross slides. The double sided swivel levers 112 are provided with T slots on their outer faces, in order that the connecting rods may be steplessly connected from the fulcrum point outwards, thus giving slide movements from zero to the maximum, without changing the cam. The return stroke is now obtained, firstly by the return cam section 117 moving the swivel lever 112 towards the centre of the cam discs 92 and 93, and secondly, by the pillars 106 being raised by the eccentrics on the shafts 104 as already described. It is to be noted that by using double sided cam levers 112 as shown in the drawings, one cam is sufficient to operate two cross slides, each slide having an independent length of stroke.

Figure 10:
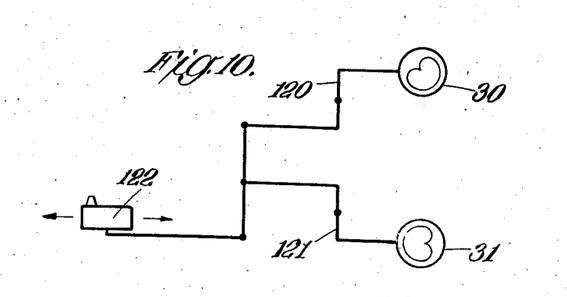
Figure 10 is a diagram illustrating a modification hereinafter described.

In another alternative arrangement diagrammatically illustrated in Figure 10, two variable stroke levers 120 and 121 are employed, operated by the feed cam 30 and the idle movement cam 31, to give the required movement to the tool slide 122.

It will be seen that the various examples described can be applied both to the movement of cross slides and for actuating longitudinal slides, in each case two separate cams being employed, from one of which cams is derived the normal cutting feed motion, and from the other the rapid idle movement by which tools are rapidly advanced to the work and rapidly withdrawn, and preferably a variable stroke lever is employed in conjunction with the feed cam, for obtaining varying lengths and rates of feed. A variable stroke lever may also be employed in conjunction with the cam providing the rapid idle stroke for obtaining varying lengths of idle movement of slides. The combination of two tooth racks and a rolling pinion constitutes a differential gear, and a lever having an adjustable fulcrum, in so far as it can be employed for resolving two independent motions, is also a differential gear. The detailed means whereby resolution of motions derived from two cams is effected offer a choice of a large number of alternatives, but for application to machines in which considerations of space are important, the means described are considered preferable.

What I claim and desire to secure by Letters Patent of the United States is:—

1. In a lathe or like machine tool, a mechanism for actuating one or more tool slides or work holders, comprising in combination a cam providing rectilinear feed motion transmitted to one element of a differential gear, a separate cam providing rapid rectilinear motion in both forward and reverse directions, transmitted to the second element of the differential gear, the resultant motion of the third element of the said differential gear being transmitted to the tool slide or slides, or work holder or holders.

2. Apparatus as in claim 1, in which the respective motions derived from the two cams are resolved by the motions of a lever or levers, the fulcrum or fulcrums of which is or are moved by the motion derived from one of the same.

3. Apparatus as in claim 1, in which the rectilinear feed motion derived from one cam is transmitted to a slidably mounted toothed rack, the rapid rectilinear forward and reverse motions derived from the second cam being transmitted to a pinion meshing with said rack and causing the pinion to roll along the rack, and a further toothed rack engaging the opposite side of the pinion, transmitting the resultant of the motions of the pinion and the other rack to the tool slide or slides, or work holder or work holders.

4. Apparatus as in claim 1, in which a lever or levers of adjustable stroke transmit the motions derived from either or both of the cams to the respective elements of the mechanism for resolving the motions derived from the two cams, for the purposes described.

5. Apparatus as in claim 1 wherein for each tool slide one lead cam is employed to obtain every length of cutting travel within the capacity of the machine, by means of a variable stroke lever to which an operating rod can be connected at any point from the fulcrum outwards, and also an idle fast travel which is substantially constant, regardless of the cutting length being used, is obtained by means of two racks and a slidable pinion, the movement of which latter produces the idle travel.

6. Apparatus as in claim 1, wherein for each tool slide one lead cam is employed to obtain every length of cutting travel within the capacity of the machine, by means of a variable stroke lever to which an operating rod can be connected at any point from the fulcrum of said lever outwards, and also an idle fast travel which is substantially constant, regardless of the cutting length being used, is obtained by means of two racks and a slidable pinion, the movement of which latter produces the idle travel, and a slidable pinion meshing on one side with a rack held stationary during the period in which the pinion is sliding, in order to produce a double length of stroke of the rack on the opposite side.

7. Apparatus as in claim 1, wherein every length of cutting travel for a tool slide or workholder within the capacity of the machine, and an idle fast travel which is substantially constant irrespective of the cutting travel, are obtainable by means of two slidably mounted racks meshing on opposite sides of a slidably mounted pinion, one of the said racks deriving motion from a feed cam by means of a variable stroke lever to which a link attached to the rack can be pivotally connected at any point from the fulcrum of said lever outwards, the pinion being caused to move in rolling relationship with the said rack by a separate cam, the motion of the other rack being transmitted to the tool slide or workholder, the resultant travel of the tool slide actuating rack being twice that of the pinion when the other rack is held stationary.

8. Apparatus as in claim 1, wherein the cutting travel derived from one cam is translated by means of an adjustable stroke lever to which an operating rod can be pivotally connected at any point from the fulcrum of said lever outwards, the fulcrum receiving motion from a separate cam to produce an idle fast travel which is substantially constant.

9. Apparatus as in claim 1, wherein the independently adjustable cutting travel for a plurality of tool slides or workholders is derived from one cam by means of a double-sided lever to which an operating rod or rods can be pivotally connected at any point from the fulcrum outwards on each side of said lever, the fulcrum of which derives motion from a separate cam to produce an idle fast travel which is substantially constant.

10. Apparatus as in claim 1, wherein the cutting travel for one slide is derived from one cam by means of a lever to which an operating rod can be pivotally connected at any point from the fulcrum outwards, the lever fulcrum being mounted on a pillar deriving sliding motion from a separate cam by means of an eccentric rotated by a pinion meshing with a slidable rack actuated by a lever bearing upon the said separate cam to produce an idle fast travel which is substantially constant.

11. Apparatus as in claim 1, wherein the cutting travel for a plurality of slides is derived from one cam by means of a double-sided lever to which operating rods can be pivotally connected at any points from the fulcrum of said lever outwards, the lever fulcrum being mounted on a pillar deriving sliding motion from a separate cam by means of an eccentric rotated by a pinion meshing with a slidable rack actuated by a lever bearing upon said separate cam to produce an idle fast travel which is substantially constant.

12. Apparatus as in claim 1, wherein the independently adjustable cutting travels for a plurality of tool slides or work-holders are derived from cams by means of levers to which operating rods can be pivotally connected at any points from the fulcrums of said levers outwards, the fulcrums of all the levers deriving simultaneous movement from the motion of a separate cam to produce simultaneously substantially constant idle fast motion to all the tool slides or workholders.

13. Apparatus as in claim 1, wherein the independently adjustable cutting travels for a plurality of tool slides or workholders are derived from cams by means of levers to which operating rods can be pivotally connected at any points from the fulcrums of said levers outwards, the fulcrum of each lever being mounted on a slidable pillar actuated by an eccentric rotated by a pinion, all the pinions associated with all of the eccentrics and pillars meshing with a rack actuated by a lever deriving motion from a separate cam providing simultaneous substantially constant idle fast motion to all the tool slides or workholders.

REGINALD JOHN DIXON.